United States Patent
Yeh et al.

(10) Patent No.: US 8,421,391 B2
(45) Date of Patent: Apr. 16, 2013

(54) ELECTRIC MOTOR STATOR WINDING TEMPERATURE ESTIMATION SYSTEMS AND METHODS

(75) Inventors: Chia-Chou Yeh, Gardena, CA (US); Steven E. Schulz, Torrance, CA (US)

(73) Assignee: GM Global Technology Operations LLC, Detroit, MI (US)

( * ) Notice: Subject to any disclaimer, the term of this patent is extended or adjusted under 35 U.S.C. 154(b) by 418 days.

(21) Appl. No.: 12/778,733

(22) Filed: May 12, 2010

(65) Prior Publication Data

US 2011/0279074 A1 Nov. 17, 2011

(51) Int. Cl.
*H02P 7/00* (2006.01)

(52) U.S. Cl.
USPC ............ 318/432; 318/473; 318/400.15

(58) Field of Classification Search .......... 318/432, 318/473, 400.15, 434, 400.01, 433; 123/41.02
See application file for complete search history.

(56) References Cited

U.S. PATENT DOCUMENTS

| | | | |
|---|---|---|---|
| 4,958,116 A | 9/1990 | Hirose | |
| 5,043,649 A | 8/1991 | Murakami et al. | |
| 5,144,216 A | 9/1992 | De Doncker | |
| 5,334,923 A | 8/1994 | Lorenz et al. | |
| 5,936,820 A | 8/1999 | Umemura et al. | |
| 6,433,506 B1 | 8/2002 | Pavlov et al. | |
| 6,683,428 B2 | 1/2004 | Pavlov et al. | |
| 6,854,881 B2 | 2/2005 | Nada | |
| 6,870,348 B2 | 3/2005 | Mijalkovic et al. | |
| 7,560,895 B2 | 7/2009 | Arnet | |
| 7,570,074 B2 | 8/2009 | Gao et al. | |
| 7,615,951 B2 | 11/2009 | Son et al. | |
| 7,746,013 B2 | 6/2010 | Fernengel et al. | |
| 8,013,565 B2 | 9/2011 | Miura | |
| 8,384,338 | 2/2013 | Lu et al. | |
| 2009/0066283 A1 | 3/2009 | Son et al. | |

(Continued)

FOREIGN PATENT DOCUMENTS

| | | |
|---|---|---|
| CN | 101261162 A | 9/2008 |
| CN | 201281637 Y | 7/2009 |

OTHER PUBLICATIONS

Mellor, P.H., et al. "Lumped parameter thermal model for electrical machines of TEFC design," IEEE Proceedings on Electric Power Applications, Sep. 1991, pp. 205-218, vol. 138, No. 5.

(Continued)

*Primary Examiner* — Karen Masih
(74) *Attorney, Agent, or Firm* — Ingrassia Fisher & Lorenz, P.C.

(57) ABSTRACT

An electric motor system includes an electric motor comprising a stator with windings and a rotor configured to operate at a motor speed; a cooling system comprising coolant configured to cool the rotor and the stator, the coolant having a coolant flow rate and a coolant temperature; an inverter module coupled to the electric motor and configured to provide current to the windings based on inverter control signals; a current regulated torque controller coupled to the inverter module and configured to generate the inverter control signals in response to a derated torque command; and a temperature estimation controller coupled to the current regulated torque controller and configured to generate the derated torque command based on an initial torque command and an estimated stator winding temperature. The temperature estimation controller is configured to estimate the estimated stator winding temperature based on the motor speed and the coolant flow rate.

20 Claims, 5 Drawing Sheets

U.S. PATENT DOCUMENTS

2009/0189561 A1     7/2009    Patel
2010/0236502 A1*   9/2010    Watanabe et al. .......... 123/41.02
2011/0050141 A1     3/2011    Yeh et al.

OTHER PUBLICATIONS

Asaii, B., et al. "A new thermal model for EV induction machine drives," IEEE Power Electronics in Transportation, Oct. 1996, pp. 175-182.

Gao, Z., et al. "A sensorless adaptive stator winding temperature estimator for mains-fed induction machines with continuous-operation periodic duty cycles," IEEE Transactions on Industry Applications, Sep./Oct. 2008, pp. 1533-1542, vol. 44, No. 5.

Briz, F., et al. "Temperature estimation in inverter-fed machines using high-frequency carrier signal injection," IEEE Transactions on Industry Applications, May/Jun. 2008, pp. 799-808, vol. 44, No. 3.

Al-Tayie, J.K., et al. "Estimation of speed, stator temperature and rotor temperature in cage induction motor drive using the extended kalman filter algorithm," IEEE Proceedings in Electric Power Applications, Sep. 1997, pp. 301-309, vol. 144, No. 5.

Colby, R.S., et al. "A model reduction perspective on thermal models for induction machine overload relays," IEEE Transactions on Industrial Electronics, Oct. 2008, pp. 3525-3534, vol. 55, No. 10.

Yeh, C-C., et al. "Electric Motor Stator Winding Temperature Estimation," U.S. Appl. No. 12/568,002, filed Sep. 28, 2009.

Campbell, M., et al. "Methods and Systems for Induction Machine Control," U.S. Appl. No. 12/635,313, filed Dec. 10, 2009.

United States Patent and Trademark Office, U.S. Office Action dated Mar. 28, 2012 for U.S. Appl. No. 12/568,002.

U.S. Notice of Allowance, dated Aug. 8, 2012, for U.S. Appl. No. 12/784,873.

U.S. Office Action, dated Aug. 9, 2012, for U.S. Appl. No. 12/635,313.

U.S. Office Action, dated Aug. 16, 2012, for U.S. Appl. No. 12/568,002.

U.S. Notice of Allowance, dated Feb. 26, 2013, for U.S. Appl. No. 12/568,002.

Chinese Patent & Trademark Office. Chinese Office Action dated Dec. 21, 2012 for Application No. 201010269361.8.

Chinese Patent & Trademark Office. Chinese Office Action dated Jan. 30, 2013 for Application No. 201110122349.9.

\* cited by examiner

ELECTRIC MOTOR STATOR WINDING TEMPERATURE ESTIMATION SYSTEMS AND METHODS

TECHNICAL FIELD

The present invention generally relates to electric motor systems, and more particularly relates to methods and systems for estimating the temperature of stator windings in an electric motor.

BACKGROUND

Hybrid electric vehicles (HEVs) typically include an alternating current (AC) electric motor driven by a direct current (DC) power source, such as a battery. Stator windings of the electric motor may be coupled to a power inverter module that performs a rapid switching function to convert the DC power to AC power to drive the electric motor, which in turn drives a drivetrain shaft of the HEV.

The temperature of motor stator windings is an important parameter and may be used for a variety of purposes. For example, stator winding temperatures may be an input in various motor control algorithms, particularly algorithms that utilize stator resistance as a control variable. Additionally, stator winding temperatures can also be used to detect high motor temperatures to prevent overheating. Conventionally, the temperatures of the stator windings are measured by a temperature measurement sensor, such as a thermistor or thermocouple, installed or mounted on one of the stator windings. However, in some systems, there may be large temperature gradients between the temperature sensor and the high temperature areas of the stator winding, which may result in accuracy issues. More than one sensor may be used, although each additional sensor raises issues with placement, cost, reliability, service, and maintenance.

To reduce or even eliminate the need for temperature sensors, sensorless stator winding temperature estimation techniques have also been developed. These temperature estimation techniques may employ complex motor thermal models based on machine geometry and thermal and electrical properties. However, in many cases, information regarding such motor geometry or thermal or electrical properties may not be readily available, and the resulting assumptions may result in inaccuracies. Other sensorless stator winding temperature estimation techniques have been developed that work well for zero or low speed temperature estimation (e.g., below 75 rpm); however, these techniques may not yield accurate results at higher motor speeds.

Accordingly, it is desirable to provide methods and systems for estimating stator winding temperatures over the entire motor speed operating range (i.e., low operating speeds and high operating speeds) with improved accuracy. Furthermore, other desirable features and characteristics of the present invention will become apparent from the subsequent detailed description and the appended claims, taken in conjunction with the accompanying drawings and the foregoing technical field and background.

SUMMARY

In accordance with an exemplary embodiment, an electric motor system includes an electric motor comprising a stator with windings and a rotor configured to operate at a motor speed; a cooling system comprising coolant configured to cool the rotor and the stator, the coolant having a coolant flow rate and a coolant temperature; an inverter module coupled to the electric motor and configured to provide current to the windings based on inverter control signals; a current regulated torque controller coupled to the inverter module and configured to generate the inverter control signals in response to a derated torque command; and a temperature estimation controller coupled to the current regulated torque controller and configured to generate the derated torque command based on an initial torque command and an estimated stator winding temperature. The temperature estimation controller is configured to estimate the estimated stator winding temperature based on the motor speed and the coolant flow rate.

In accordance with an exemplary embodiment, a method is provided for estimating stator winding temperatures in a motor having a stator with a plurality of windings and a rotor configured to operate at a motor speed. The motor is further configured to be cooled by a coolant at a coolant flow rate. The method includes comparing the motor speed to a speed threshold; generating estimated total power losses of the electric motor; calculating combined thermal impedances between the plurality of windings and the coolant based on the motor speed and the coolant flow rate; and estimating, when motor speed is greater than the speed threshold, first estimated stator winding temperatures for each of the plurality of stator windings based on the combined thermal impedances and the total power losses.

DESCRIPTION OF THE DRAWINGS

The present invention will hereinafter be described in conjunction with the following drawing figures, wherein like numerals denote like elements, and wherein.

DETAILED DESCRIPTION OF AN EXEMPLARY EMBODIMENT

The following detailed description is merely exemplary in nature and is not intended to limit the invention or the application and uses of the invention. Any embodiment described herein as exemplary is not necessarily to be construed as preferred or advantageous over other embodiments and merely serves as an example, instance, or illustration. All of the embodiments described in this Detailed Description are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary or the following detailed description.

Exemplary embodiments discussed herein relate to methods and systems for estimating the temperature of stator windings in an electric motor. The disclosed methods and systems may be implemented in operating environments where it is necessary to estimate the temperature of stator windings over low and high speeds, including in a hybrid and electric vehicle power system of a hybrid electric vehicle (HEV). For example, the systems and methods estimate the high speed stator winding temperatures as a function of motor speed and coolant flow rates for a more accurate estimation relative to conventional techniques.

Figure 1:
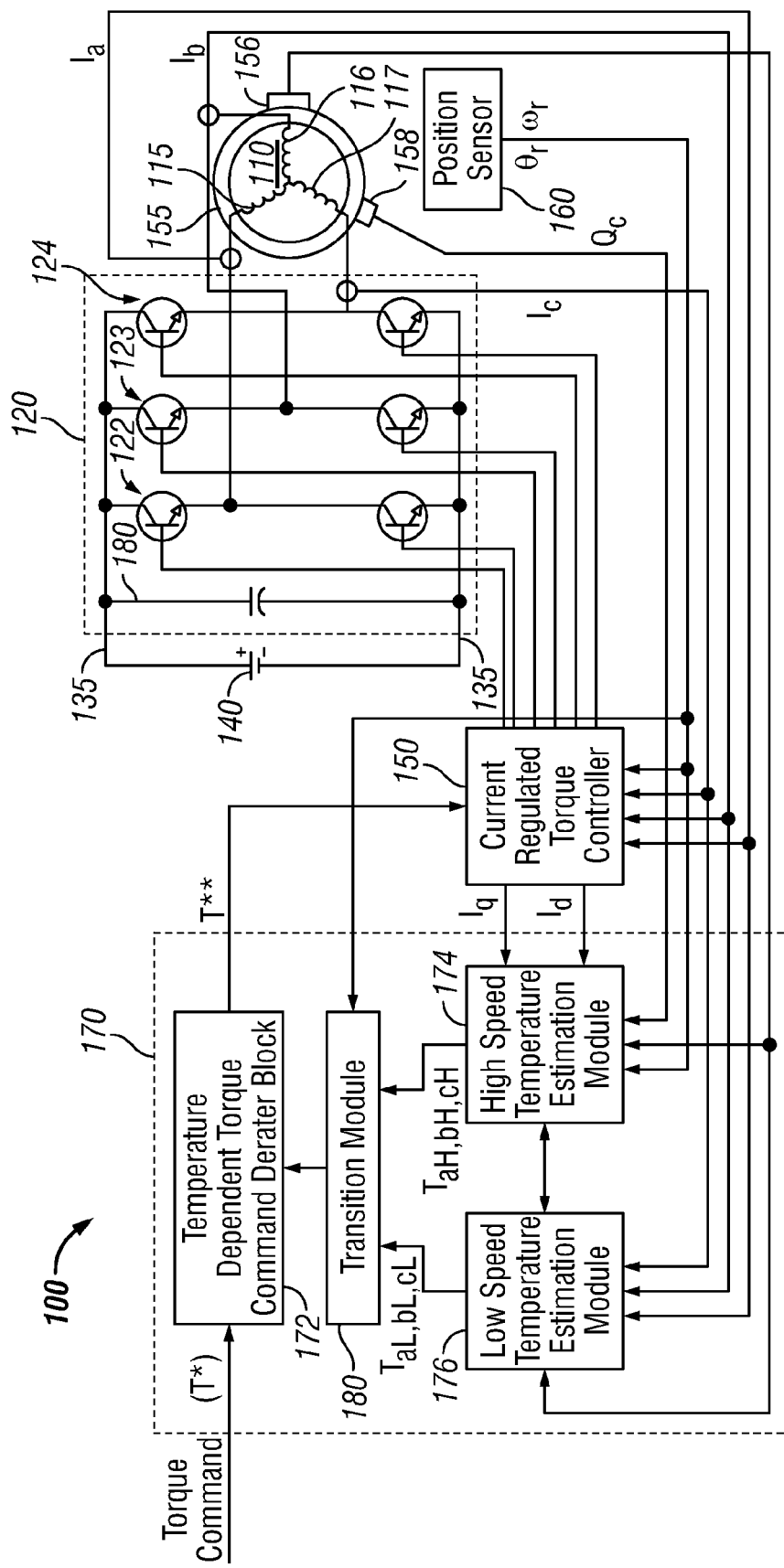
FIG. 1 is a block diagram of an electric motor system in accordance with an exemplary embodiment.

FIG. 1 illustrates a simplified block diagram of a three-phase electric motor system 100 architecture that may be implemented in a hybrid electric vehicle (HEV). In one exemplary embodiment, the system 100 includes a three-phase AC electric motor 110, a three-phase pulse width modulated (PWM) inverter module 120, a DC power source 140, a current regulated torque controller 150, a coolant temperature sensor 156, a coolant flow rate sensor 158, a rotor position sensor 160, and a temperature estimation controller 170. As described in greater detail below, during operation, the system 100 receives a torque command (T*) based on, for example, inputs from a driver. Since elevated temperatures may result in undesirable issues for the motor 110 and the temperature of the motor 110 is based, in part, on the torque, the temperature estimation controller 170 derates or limits the torque command (T*) based on the estimated temperature of the motor 110 to produce a derated torque command (T). This derated torque command (T) corresponds to the acceptable torque output of the motor 110 given the torque command (T*) and the current temperature of the motor 110. The current regulated torque controller 150 receives the derated torque command (T**) and, in response, controls the inverter module 120 to drive the motor 110. The motor 110 produces a torque on the drive shaft (not shown) of the HEV. A more detailed description of the system 100 will now be provided.

The motor 110 generally includes a stator with stator windings 115, 116, 117 that, when supplied with alternating current, produce a rotating magnetic field that causes a rotor (not shown) to rotate and generate torque. In the depicted exemplary embodiment, the three stator windings 115, 116, 117 define a three-phase motor. In general, the motor 110 may be a permanent magnet synchronous motor, including an interior permanent magnet motor; an induction motor; a synchronous reluctance motor; or any other type of suitable electric motor.

The inverter module 120 drives the operation of the motor 110. The inverter module 120 generally includes a capacitor 180 and three inverter sub-modules 122, 123, 124, each corresponding to a switching device respectively coupled to the stator windings 115, 116, 117. Each switching device 122, 123, 124 includes two switches (e.g., transistors such as Insulated Gate Bipolar Transistors (IGBTs)) that operate in an alternating manner with antiparallel diodes (not shown) to appropriately switch an input voltage and provide three-phase energization of the stator windings 115, 116, 117 of the motor 110.

The inverter module 120 is connected between direct current (DC) bus lines 135 of the DC power source 140 (e.g., one or more batteries or fuel cells) that supplies a DC input voltage ($V_{DC}$). As noted above, the switching devices 122, 123, 124 supply alternating current (Ia, Ib, Ic) to drive the three-phases corresponding to the stator windings 115, 116, 117 of the motor 110 at varying speeds based on the DC input voltage ($V_{DC}$) and control signals from the current regulated torque controller 150. Additional details of the current regulated torque controller 150 may be found in U.S. patent application Ser. No. 12/568,002, filed Sep. 28, 2009 and assigned to the assignee of the present invention, which is incorporated by reference herein in its entirety.

A cooling system 155 with a coolant, such as motor oil, surrounds and cools the motor 110 during operation. The coolant temperature sensor 156 determines the temperature of the coolant and provides a digital signal representation of the coolant temperature ($T_{COOLANT}$). Additionally, the coolant flow rate sensor 158 determines the flow rates ($Q_{COOLANT}$) of the coolant in the rotor and/or stator. As discussed in greater detail below, the coolant temperature ($T_{COOLANT}$) and the coolant flow rates ($Q_{COOLANT}$) are provided to the temperature estimation controller 170 for use in estimating the temperature of the stator windings 115, 116, 117. In one exemplary embodiment, the coolant flow rate ($Q_{COOLANT}$) may be measured directly. In another exemplary embodiment, the coolant flow rate ($Q_{COOLANT}$) may be derived as a function of the flow pressure, coolant and motor temperatures, motor torque, and motor speed. In further exemplary embodiments, the coolant flow rate sensor 158 may for a part of, or otherwise communicate with, a transmission control module and/or a hybrid control processor.

The rotor position sensor 160 is positioned to generate absolute angular position information and/or angular velocity information that correspond to the mechanical angle ($\theta_r$) of the rotor and the angular velocity or speed ($\omega_r$) of the rotor. In one exemplary embodiment, the rotor position sensor 160 may be implemented as a resolver and a resolver-to-digital converter, but can generally be any type of physical position sensor or transducer or virtual software implementation thereof, including a Hall Effect sensor or any other similar sensing device or encoder that senses the angular position or angular velocity of the rotor. The rotor position sensor 160 provides the angular position ($\theta_r$) and speed ($\omega_r$) to the current regulated torque controller 150 and the temperature estimation controller 170.

The temperature estimation controller 170 includes a temperature dependent torque command derater block 172, a high speed temperature estimation module 174, a low speed temperature estimation module 176, and a transition module 180. The high speed temperature estimation module 174 receives synchronous frame currents ($I_d$, $I_q$) from the current regulated torque controller 150 and estimates the phase temperatures ($T_{aH}$, $T_{bH}$, $T_{cH}$) of the stator windings 115, 116, 117 at high speeds. As discussed in greater detail below, the estimated temperatures ($T_{aH}$, $T_{bH}$, $T_{cH}$) are generated based on the synchronous frame currents ($I_d$, $I_q$), rotor speed ($\omega_r$), the DC voltage ($V_{DC}$), the coolant temperature ($T_{COOLANT}$), and the coolant flow rates ($Q_{COOLANT}$). The low speed temperature estimation module 176 receives the detected current values ($I_a$, $I_b$, $I_c$) and estimates the phase temperatures ($T_{aL}$, $T_{bL}$, $T_{cL}$) of the stator windings 115, 116, 117 at low temperatures based on the current values ($I_a$, $I_b$, $I_c$) and the coolant temperature ($T_{COOLANT}$).

The estimated phase temperatures ($T_{aH}$, $T_{bH}$, $T_{cH}$) from the high speed temperature estimation module 174 and the estimated phase temperatures ($T_{aL}$, $T_{bL}$, $T_{cL}$) from the low speed temperature estimation module 176 are provided to the transition module 180. Depending on the rotor speed ($\omega_r$), the transition module 180 provides one set of the estimated phase temperatures ($T_a$, $T_b$, $T_c$) to temperature dependent torque command derater block 172. In one exemplary embodiment, high speeds correspond to rotor speeds ($\omega_r$) greater than 75 rpm, while low speeds correspond to rotor speeds ($\omega_r$) less than 75 rpm, although the selection of the threshold between high and low speed may vary.

As noted above, the temperature dependent torque command derater block 172 modifies the torque command (T*) in response to the selected set of phase temperatures ($T_a$, $T_b$, $T_c$) to generate a temperature derated torque command (T). The current regulated torque controller 150 controls the operation of the inverter module 120, and thus the motor 110, to produce the output torque based on the derated torque command (T).

Accordingly, the operational control signals apply the gain represented by the temperature derated torque control signal (T) to the command signals applied to the inverter module 120. Thus, the currents at each of the stator windings 115, 116, 117 are received and modified by the current regulated torque controller 150 in response to the temperature derated torque control signal (T) to provide appropriate gain to the operational control signals while integrating a temperature dependent torque derating into the control structure at all speeds. Accurate estimation of the temperature of each stator winding 115, 116, 117 may prevent overheating of the motor 110 while providing efficient operation.

Figure 2:
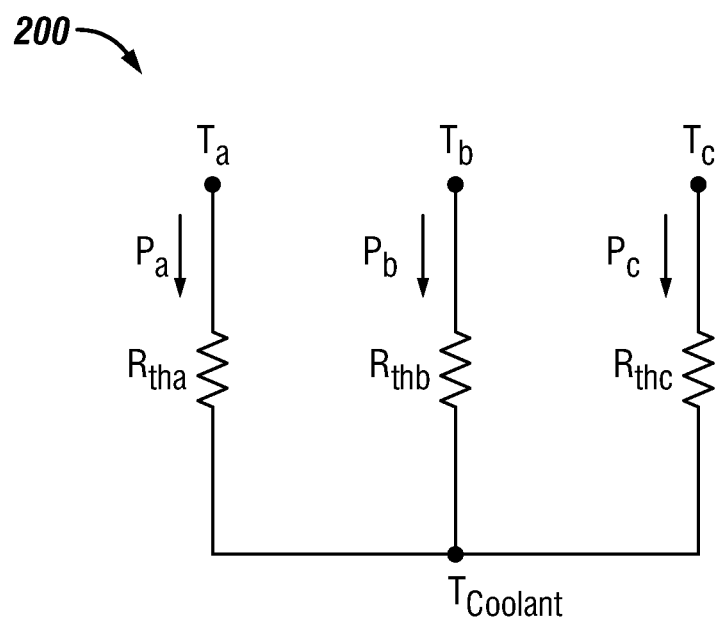
FIG. 2 is a circuit diagram representation of a thermal impedance model associated with the system of FIG. 1 in accordance with an exemplary embodiment.

FIG. 2 is a circuit diagram representation of a thermal impedance model 200 in accordance with an exemplary embodiment. The thermal impedance model 200 may be used by the high speed temperature estimation module 174 in accordance with an exemplary embodiment to determine the estimated winding temperatures ($T_{aH}$, $T_{bH}$, $T_{cH}$) at high speeds.

The thermal impedance model 200 depicted in FIG. 2 may be expressed as Equation (1), as follows:

$$\text{Temperature Change} = \text{Thermal Impedance} * \text{Total Power Dissipation} \quad (1)$$

For example, the temperature difference ($\Delta T_x$) between the temperature ($T_x$) of the stator winding and coolant temperature ($T_{COOLANT}$) is equal to the product of the thermal impedance ($R_{thx}$) and power dissipation ($P_x$) for a particular phase. The thermal impedance model 200 is described more fully below with reference to Equations (4) through (6).

When the rotor speed ($\omega_r$) is above a particular value (e.g. 75 rpm), the estimated winding temperatures ($T_{aH}$, $T_{bH}$, $T_{cH}$) may be calculated based on a thermal impedance ($R_{th}$) between the stator windings 115, 116, 117 and coolant. In the depicted diagram, the thermal impedance ($R_{tha}$) is the thermal impedance between the temperature ($T_a$) of the first winding 115 and the coolant temperature of the motor coolant ($T_{COOLANT}$), the thermal impedance ($R_{thb}$) is the thermal impedance between the temperature ($T_b$) of the second winding 116 and the coolant temperature ($T_{COOLANT}$), and the thermal impedance ($R_{thc}$) is the thermal impedance between the temperature ($T_c$) of a third winding 117 and the coolant temperature ($T_{COOLANT}$).

Power dissipation due to stator winding (or copper) loss and stator core (or iron) loss can be expressed using Equations (2) and (3), respectively, as follows:

$$P_{cu} = R_{DC} i_x^2, \quad R_{DC} = \frac{N_c N l_{turn}}{A_{turn} \sigma_{cu}} \quad (2)$$

where $R_{DC}$ is the DC resistance per phase; $i_x$ is the stator current in a particular phase x, $N_c$ is the number of coils in a series; N is the number of turns per coil; $l_{turn}$ is the length of one turn; and $A_{turn}$ is the area of one turn; and $\sigma_{cu}$ is the conductivity of copper; and $$P_{iron} = P_h + P_e = \varepsilon_h \left(\frac{f}{f_n}\right) B_m^\alpha + \varepsilon_e \left(\frac{f}{f_n}\right)^2 B^2 \quad (3)$$

where $P_{iron}$ is the core (or iron) power loss; $P_h$ is the power dissipation due to hysteresis losses; $P_e$ is the power dissipation due to eddy current losses; B and $B_m$ are the peak flux density; $\alpha$, $\varepsilon_h$, and $\varepsilon_e$ are constants for the particular core material; f is the operating frequency of the motor; $f_n$ and is the fundamental nominal frequency of the motor.

As shown in Equation (3), at low motor operating speeds, core losses ($P_{iron}$) are negligible since operating frequency (f) is a function of rotor speed ($\omega_r$). However, at higher operating speeds, the operating frequency (f) increases and core losses ($P_{iron}$) become more significant. Accordingly, these core losses ($P_{iron}$) should be accounted for at high operating speeds to improve accuracy of the estimation. In general, heat generated in the motor 110 includes heat generated due to winding losses ($P_{cu}$) and core losses ($P_{iron}$) when using the high speed temperature estimation module 174. The heat generated by windings losses ($P_{cu}$) may be calculated using the stator currents and stator resistances described above with reference to Equation (2).

The thermal impedance in each phase includes thermal impedance between the stator winding and the stator core and the thermal impedance between the stator core and the motor coolant. For example, in a particular phase, the thermal impedance can be represented as Equation (4), as follows:

$$R_{thx} = R_{wcx} + R_{ccx} \quad (4)$$

where $R_{thx}$ is the thermal impedance between the stator winding and the motor coolant, $R_{wcx}$ is the thermal impedance between the stator winding and stator core, and $R_{ccx}$ is the thermal impedance between the stator core and motor coolant.

As such, at high speeds, the estimated temperature of the stator windings 115, 116, 117 may be estimated using the thermal impedances ($R_{tha}$, $R_{thb}$, $R_{thc}$) and Equations (5), (6) and (7) as follows:

$$T_a = R_{tha}\left(\frac{1 + T_{za}s}{1 + 2\xi_a T_{wa}s + (T_{wa}s)^2}\right)(I_s^2 R_{sa} + P_{core}) + T_{coolant} \quad (5)$$

$$T_b = R_{thb}\left(\frac{1 + T_{zb}s}{1 + 2\xi_b T_{wb}s + (T_{wb}s)^2}\right)(I_s^2 R_{sb} + P_{core}) + T_{coolant} \quad (6)$$

$$T_c = R_{thc}\left(\frac{1 + T_{zc}s}{1 + 2\xi_c T_{wc}s + (T_{wc}s)^2}\right)(I_s^2 R_{sc} + P_{core}) + T_{coolant} \quad (7)$$

where $T_{zx}$ is the lead time constant [seconds], $T_{wx}$ is the natural damped frequency [seconds], $\xi_x$ is the damping factor, $I_s$ is the RMS stator current value [Amps] computed based on the synchronous reference frame current signals ($I_{qs}^e$, $I_{ds}^e$), $R_{sx}$ is the stator resistance [Ω], $P_{core}$ is the stator core/iron loss [Watts], $T_{COOLANT}$ is the motor coolant temperature [°C.]; and x represents a, b, or c. It is noted that at zero speed, the stator currents ($I_a$, $I_b$, $I_c$) may not be the same because there will be instances in which only two phases are carrying current and the third phase has zero current flowing. As such, at low speeds, the actual stator currents may be used to compute stator winding losses. However, for high speed estimation, the stator currents ($I_a$, $I_b$, $I_c$) in all three phases should be the same. As such, stator winding power loss in each phase can be computed using the RMS value ($I_s$) of the motor currents.

The thermal impedance model 200 is represented in Equations (5), (6), and (7) by the combination of stator resistance ($R_{thx}$) and a $2^{nd}$ order transfer function model that is used to estimate the winding temperatures ($T_a$, $T_b$, $T_c$). The bracketed terms in Equations (5), (6) and (7) represent the total power loss ($P_x$) between the stator winding and the motor coolant due to the thermal impedance of each phase. For example, the power loss ($P_x$) takes into account the winding power loss ($I_s^2 R_{sx}$) and the core power loss ($P_{core}$). The thermal impedances, as well as the coefficients of the $2^{nd}$ order transfer function, may be developed empirically offline from measured test data. This typically includes measuring phase currents, the temperature of each phase winding (e.g., with a thermistor or thermocouple), the coolant temperature ($T_{COOLANT}$) and the coolant flow rates ($Q_{COOLANT}$). This thermal model characterization may be performed using an instrumented motor, and the resulting model may be used for online temperature estimation with the same class of motor that does not have any temperature sensors directly on the stator windings.

Figure 3:
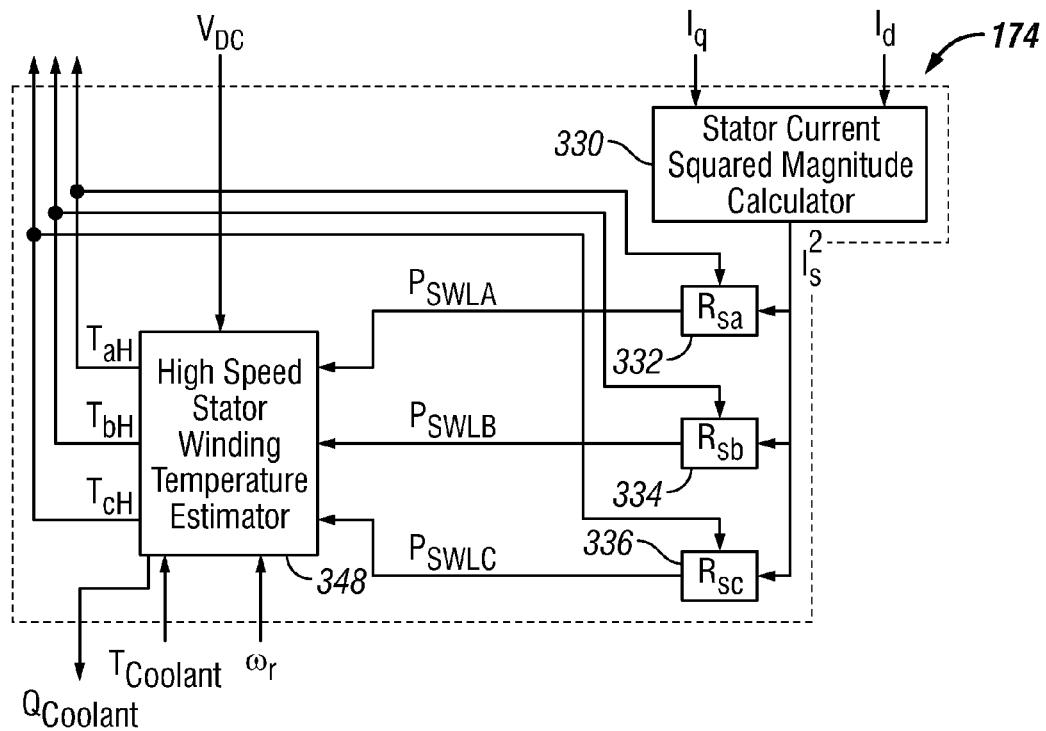
FIG. 3 is a block diagram of a high speed temperature estimation module of the electric motor system of FIG. 1 in accordance with an exemplary embodiment.

Now that a description of the model has been provided, FIG. 3 is a block diagram of the high speed temperature estimation module 174 of the system 100 of FIG. 1 in accordance with an exemplary embodiment. As noted above, the synchronous reference frame current signals ($I_d$, $I_q$) are received from the current regulated torque controller 150 (FIG. 1) by a stator current square magnitude calculator 330. The stator current square magnitude calculator 330 uses the synchronous reference frame current signals ($I_d$, $I_q$) to compute a squared RMS value ($I_s^2$) of the stator current, which is then provided to the power loss calculators 332, 334, 336. The power loss calculators 332, 334, 336 estimate the stator winding resistances ($R_{sa}$, $R_{sb}$, $R_{sc}$) according to Equations (8), (9), and (10), as follows:

$$R_{sa} = R_{25}(1 + \alpha(T_a - 25)) \quad (8)$$

$$R_{sb} = R_{25}(1 + \alpha(T_b - 25)) \quad (9)$$

$$R_{sc} = R_{25}(1 + \alpha(T_c - 25)) \quad (10)$$

where the $R_{sa}$, $R_{sb}$, and $R_{sc}$ are the stator winding resistances; $T_a$, $T_b$, $T_c$ are the estimated stator winding temperatures; $R_{25}$ designates the stator winding resistance at ambient temperature (25° C.); and $\alpha$ represents the temperature coefficient of resistance (typically 0.0039/° C. for copper winding). On a first iteration (i.e., when the system switches from low speed stator winding temperature estimation to high speed stator winding temperature estimation), the power loss calculators 332, 334, 336 use the estimated stator winding temperatures ($T_{aL}$, $T_{bL}$, $T_{cL}$) from the low speed stator phase temperature estimator 325, discussed below, or the coolant temperature ($T_{COOLANT}$) to determine the stator winding resistances ($R_{sa}$, $R_{sb}$, $R_{sc}$). On subsequent iterations, the power loss calculators 332, 334, 336 use the previously estimated high speed stator winding temperature ($T_{aH}$, $T_{bH}$, $T_{cH}$) provided via a feedback loop to determine the stator winding resistances ($R_{sa}$, $R_{sb}$, $R_{sc}$).

The power loss calculators 332, 334, 336 then multiply the squared RMS value ($I_s^2$) of the stator currents by the stator winding resistances ($R_{sa}$, $R_{sb}$, $R_{sc}$) to produce outputs representing stator winding power losses ($P_{SWLA}$, $P_{SWLB}$, $P_{SWLC}$), which are then provided to the high speed stator winding temperature estimator 348.

In addition to the stator winding power losses ($P_{SWLA}$, $P_{SWLB}$, $P_{SWLC}$), the input voltage ($V_{DC}$) of the DC voltage source, the temperature ($T_{COOLANT}$) of the coolant, the flow rate ($Q_{COOLANT}$) of the coolant, and the rotor speed ($\omega_r$) are provided as inputs to the high speed stator winding temperature estimator 348. Then, the high speed stator winding temperature estimator 348 uses these inputs to estimate the high temperature stator winding temperatures ($T_{aH}$, $T_{bH}$, $T_{cH}$), as described in greater detail below with reference to FIG. 4.

Figure 4:
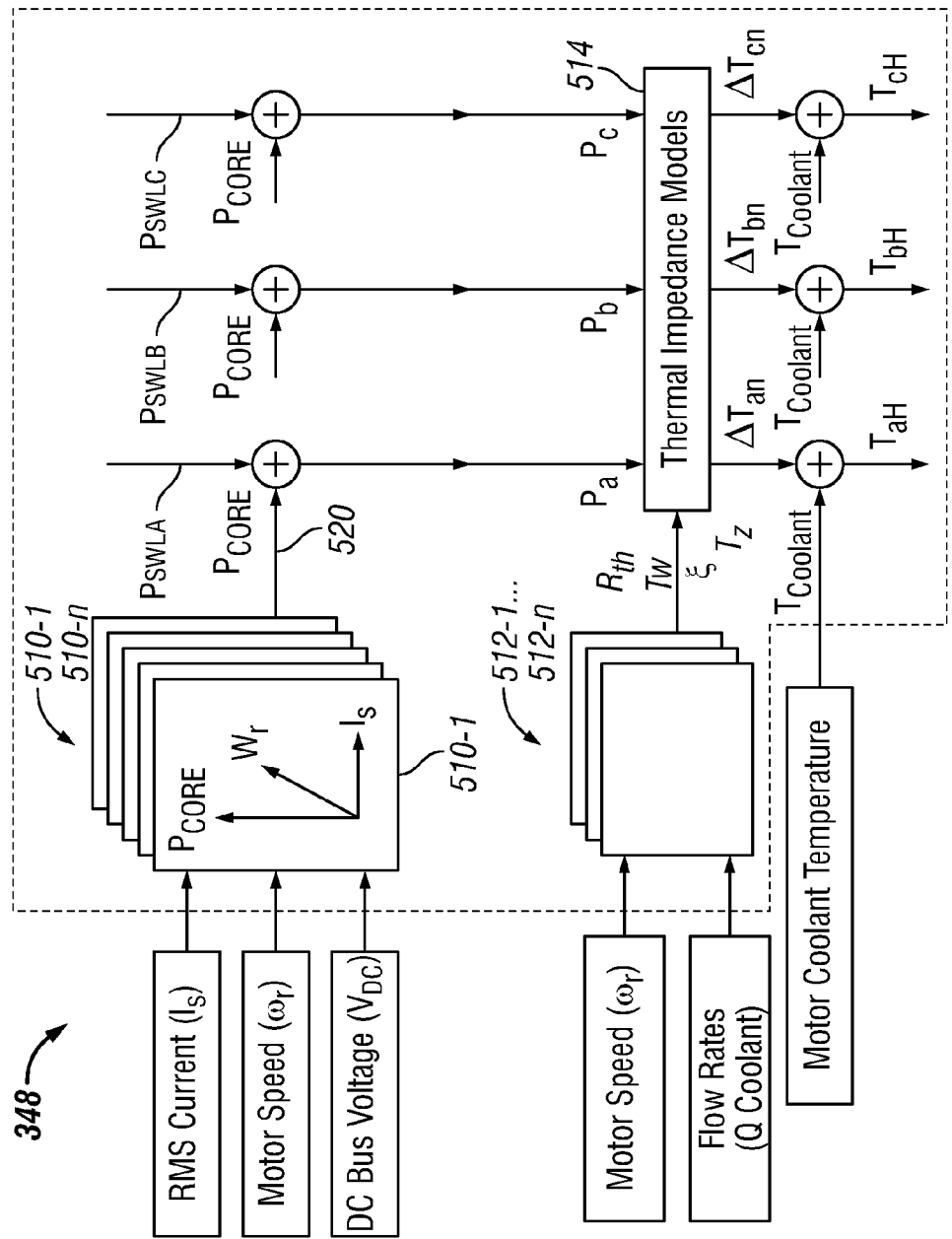
FIG. 4 is a block diagram of a high speed stator winding temperature estimator of the high speed temperature estimation module of FIG. 3 in accordance with an exemplary embodiment.

FIG. 4 illustrates a functional block diagram for describing the high speed stator winding temperature estimator 348 in accordance with an exemplary embodiment. As described above, the stator winding power losses ($P_{SWLA}$, $P_{SWLB}$, $P_{SWLC}$) for each phase are calculated based the squared RMS stator current value ($I_s^2$) and stator resistance value ($R_{sa}$, $R_{sb}$, $R_{sc}$). The stator winding power losses ($P_{SWLA}$, $P_{SWLB}$, $P_{SWLC}$) for each phase are then added to the motor core loss ($P_{core}$), which is a function of the motor speed ($\omega_r$), RMS stator winding current ($I_s$), and DC voltage ($V_{DC}$). A number of lookup tables (LUTs) 510-1 ... 510-n in the high speed stator winding temperature estimator 348 may provide the motor core losses ($P_{core}$) at various DC voltages ($V_{DC}$), motor speeds ($\omega_r$) and RMS currents ($I_s$). Interpolation (e.g., linear interpolation or other known interpolation techniques) may be used to further refine the resulting core losses ($P_{core}$) between LUT values.

The combination of the stator winding power losses ($P_{SWLA}$, $P_{SWLB}$, $P_{SWLC}$) and the core power losses ($P_{core}$) result in total power losses ($P_a$, $P_b$, $P_c$). For reference, the total power losses ($P_a$, $P_b$, $P_c$) represent the ($I_s^2 R_{sx} + P_{core}$) term of Equations (5), (6), and (7). The total power losses ($P_a$, $P_b$, $P_c$) are subsequently provided as inputs to thermal impedance models 514.

The thermal impedance model 514 determines the $$R_{tha}\left(\frac{1 + T_{za}s}{1 + 2\xi_a T_{wa}s + (T_{wa}s)^2}\right)$$

term Equations (5), (6), and (7). In particular, the thermal impedance model 514 calculates the appropriate lead time constants ($T_{za}$, $T_{zb}$, $T_{zc}$), natural damped frequencies ($T_{wa}$, $T_{wb}$, $T_{wc}$), damping factors ($\xi_a$, $\xi_b$, $\xi_c$), and thermal impedances ($R_{tha}$, $R_{thb}$, $R_{thc}$).

In one exemplary embodiment, the natural damped frequencies ($T_{wa}$, $T_{wb}$, $T_{wc}$), the damping factors ($\xi_a$, $\xi_b$, $\xi_c$), and the thermal impedances ($R_{tha}$, $R_{thb}$, $R_{thc}$) are each a function of the motor speed ($\omega_r$) and/or the flow rates ($Q_{COOLANT}$) of the coolant. For example, the natural damped frequencies ($T_{wa}$, $T_{wb}$, $T_{wc}$) are a function of the flow rates ($Q_{COOLANT}$) of the coolant. The damping factors ($\xi_a$, $\xi_b$, $\xi_c$) are a function of the flow rates ($Q_{COOLANT}$) of the coolant. The thermal impedances ($R_{tha}$, $R_{thb}$, $R_{thc}$) are a function of the motor speed ($\omega_r$) and the flow rates ($Q_{COOLANT}$) of the coolant. The lead time constants ($T_{za}$, $T_{zb}$, $T_{zc}$) may be a function of flow rates ($Q_{COOLANT}$).

Accordingly, a number of lookup tables (LUTs) 512-1 ... 512-n are provided to provide the lead time constants ($T_{za}$, $T_{zb}$, $T_{zc}$), the natural damped frequencies ($T_{wa}$, $T_{wb}$, $T_{wc}$), the damping factors ($\xi_a$, $\xi_b$, $\xi_c$), and the thermal impedances ($R_{tha}$, $R_{thb}$, $R_{thc}$) based on the inputs of the motor speed ($\omega_r$) and the coolant flow rates ($Q_{COOLANT}$). As above, interpolation may be used to further refine the resulting LUT values. These values may be developed empirically off-line from measured test data. This generally involves various measurements over a number of motor speed ($\omega_r$) and the flow rates ($Q_{COOLANT}$) in an instrumented motor to provide thermal models that may be used for temperature estimation without winding temperature sensors.

The thermal impedance models 514 calculate a change in temperature ($\Delta T_{an}$, $\Delta T_{bn}$, $\Delta T_{cn}$) for each phase. The change in temperature ($\Delta T_{an}$, $\Delta T_{bn}$, $\Delta T_{cn}$) is then added to the motor coolant temperature ($T_{COOLANT}$) to obtain the high speed estimated stator winding temperature ($T_{aH}$, $T_{bH}$, $T_{cH}$) for each phase.

Figure 5:
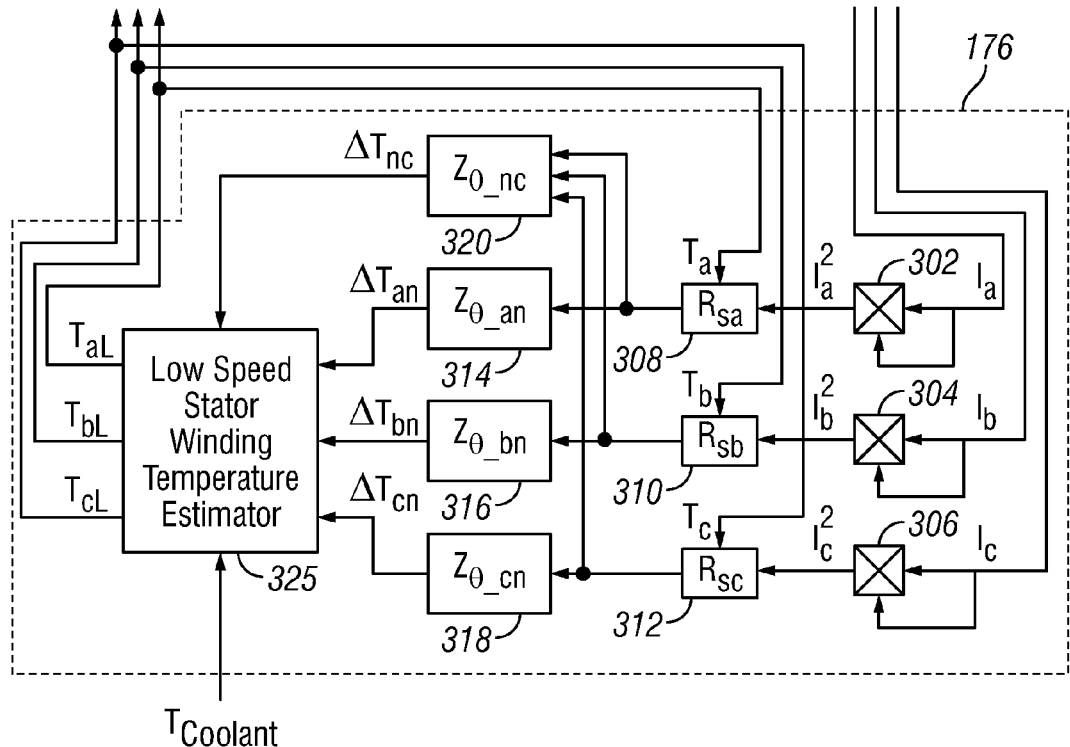
FIG. 5 is a block diagram of a low speed temperature estimation module of the electric motor system of FIG. 1 in accordance with an exemplary embodiment.

FIG. 5 is a block diagram of the low speed temperature estimation module 176 of the system 100 of FIG. 1 in accordance with an exemplary embodiment. As noted above, stator currents ($I_a$, $I_b$, $I_c$) are provided as inputs to the low speed temperature estimation module 176, particularly to combiners 302, 304, 306 that generate waveforms equivalent to the AC RMS currents ($I_a^2$, $I_b^2$, $I_c^2$) for each of the stator windings 115, 116, 117. These waveforms are provided to blocks 308, 310 and 312, respectively. Blocks 308, 310, 312 respectively calculate the stator phase resistance ($R_{sa}$, $R_{sb}$, $R_{sc}$) for each phase in response to a feedback low speed estimated temperature ($T_{aL}$, $T_{bL}$, $T_{cL}$), similar to the description above with reference to Equations (8), (9), and (10), and multiply the stator phase resistance ($R_{sa}$, $R_{sb}$, $R_{sc}$) with the AC RMS currents ($I_a^2$, $I_b^2$, $I_c^2$) from the output of the combiners 302, 304, 306. The resulting products are provided to blocks 314, 316, 318 for calculation of the temperature rise ($\Delta T_{an}$, $\Delta T_{bn}$, $\Delta T_{cn}$) due to the thermal impedance ($Z_{\theta\_an}$, $Z_{\theta\_bn}$, $Z_{\theta\_cn}$).

Outputs of blocks 308, 310, 312 are also provided to block 320 for calculation of the temperature rise ($\Delta T_{nc}$) due to the thermal impedance ($Z_{\theta\_nc}$) between the thermal neutral and the coolant. The outputs of blocks 314, 316, 318, 320, as well coolant temperature ($T_{COOLANT}$), are provided as inputs to a low speed stator phase temperature estimator 325 for estimation of the low speed temperature estimates ($T_{aL}$, $T_{bL}$, $T_{cL}$). As noted above, the low speed temperature estimates ($T_{aL}$, $T_{bL}$, $T_{cL}$) are used by the transition module 180 to determine the appropriate temperature estimates ($T_a$, $T_b$, $T_c$). Additional techniques for estimating stator temperature at low speeds are described in United States Patent Application Publication Number 2009/0189561 A1, filed Jan. 24, 2008 and assigned to the assignee of the present invention, which is incorporated by reference herein in its entirety.

Figure 6:
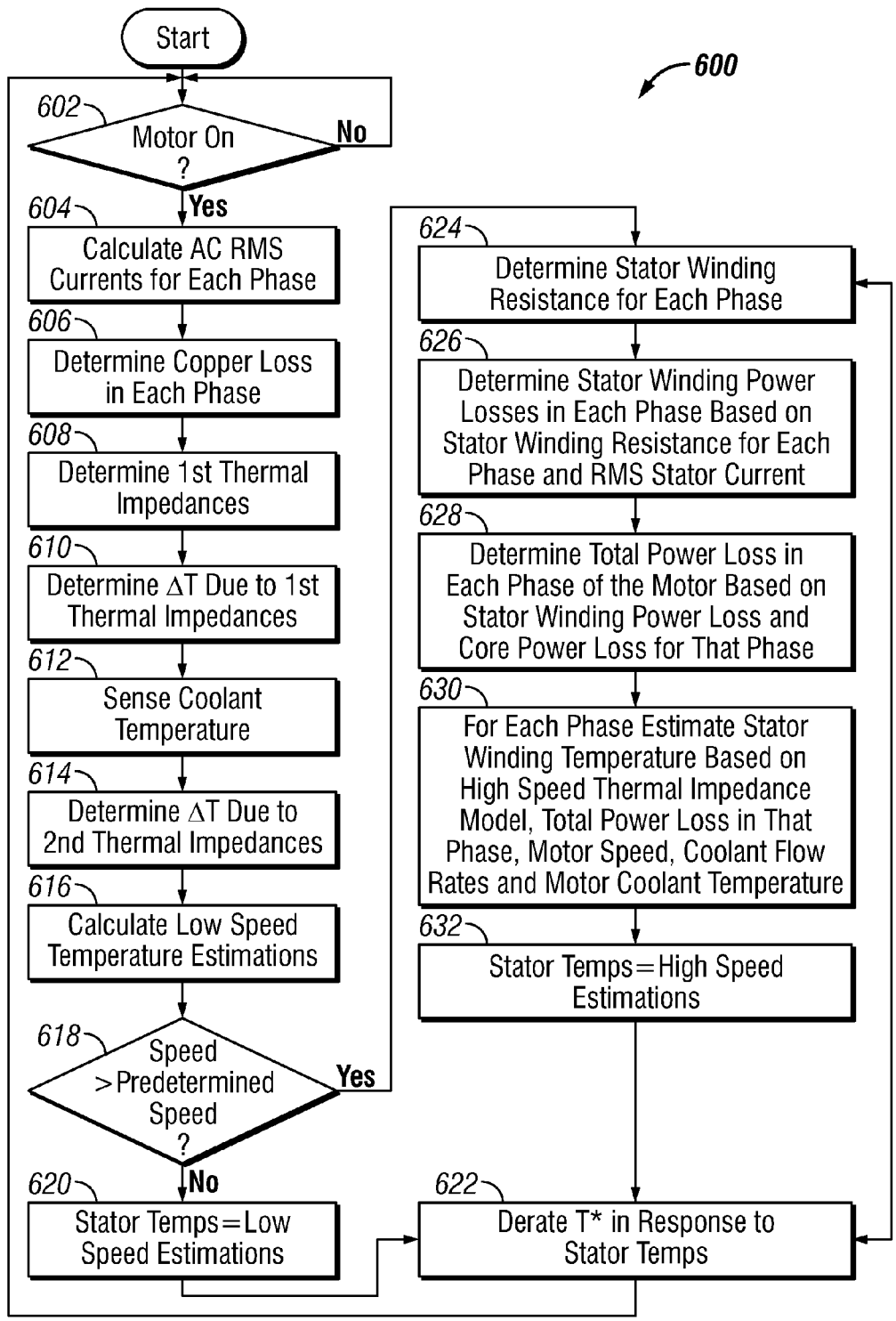
FIG. 6 is a flowchart of the operation of the system of FIG. 1 in accordance with an exemplary embodiment.

While FIGS. 1-5 depict the temperature estimation controller 170 including identifiable modules and blocks, it will be appreciated that these blocks or modules may be implemented as software modules that execute on a microprocessor, and therefore operation of the temperature estimation controller 170 may alternately be represented as steps of a method, as will now be described with reference to FIG. 6. As such, FIG. 6 illustrates a flowchart of a method 600 for the operation of a temperature estimation controller 170 of the system 100 of FIG. 1 in accordance with an exemplary embodiment. For clarity, FIG. 1 is referenced in the description below.

Processing begins when the motor 110 is turned on at step 602. After processing determines that the motor 110 is turned on at step 602, an alternating current (AC) root mean square (RMS) current value is calculated 604. The copper loss of each of the stator windings 115, 116, 117 of the motor 110 is then calculated at step 606, and first thermal impedances for each of the stator windings 115, 116, 117 of the motor 110 are calculated at step 608 in response to the copper loss calculated at step 606.

At step 610, temperature increases in the stator windings 115, 116, 117 due to corresponding thermal impedances are determined. At step 612, the temperature of the coolant is determined, for example, by the coolant temperature sensor 156. At step 614, the temperature increases due to the thermal impedance of the thermal neutral with respect to the temperature of the coolant is determined, and at step 616, low speed stator winding temperatures are estimated for each phase based on results generated at steps, 610, 612, and 614.

At step 618, processing determines whether the speed of the motor 110 is greater than a threshold speed (e.g., 75 rpms). When the speed is less than the threshold speed, at step 620 the stator winding temperatures are set equal to the estimated low speed stator temperatures from step 616. The torque command is then derated at step 622 to prevent overheating of one or more of the stator windings 115, 116, 117. Processing then returns to step 602.

When the speed is determined to be greater than or equal to the threshold speed at step 618, processing proceeds to step 624. At step 624 through 632 the high speed stator winding temperatures are estimated. In particular, at step 624, stator winding resistances of the stator windings 115, 116, 117 are determined. As noted above, in a first iteration, the stator winding resistances may be estimated, for example, using the estimated stator winding temperatures from the low speed stator phase temperature estimator. In subsequent iterations, the stator winding resistances may be estimated, for example, using the previously estimated high speed stator winding temperatures. At step 626, processing then determines stator winding power losses based on stator winding resistances and the RMS stator currents. At step 628, processing then determines total power loss in each phase based on stator winding power losses and core power losses. At step 630, processing estimates a stator winding temperature for each phase based on total power losses, motor speed, coolant temperature, and coolant flow rate. For reference, one exemplary implementation of steps 628 and 630 are described above with reference to FIG. 4. At step 632, the stator winding temperatures are set equal to the high speed estimated stator winding temperatures. Finally, in step 622, the estimated stator winding temperatures computed at step 632 are provided to the derater block 172 and used to derate the torque command. The method 600 then loops back to step 602.

Accordingly, exemplary embodiments discussed above provide systems and methods for estimating the stator winding temperatures without requiring a temperature sensor directly on the stator winding. In particular, the estimation systems and methods accurately estimate stator winding temperatures over low speed and high speeds. For example, the systems and methods estimate the high speed stator winding temperatures as a function of motor speed and coolant flow rates for a more accurate estimation.

The disclosed embodiments may be applied to a permanent magnet synchronous AC motor (PMSM), such as an Interior Permanent Magnet Synchronous Motor (IPMSM) and a Surface Mount Permanent Magnet Synchronous Motor (SMPMSM). Additionally, although an AC machine can be an AC motor (i.e., apparatus used to convert AC electrical energy power at its input to produce to mechanical energy or power), an AC machine is not limited to being an AC motor, but can also encompass generators that are used to convert mechanical energy or power into electrical AC energy or power. Moreover, although the disclosed embodiments can be implemented in operating environments such as a hybrid electric vehicle (HEV), it will be appreciated by those skilled in the art that the same or similar techniques and technologies can be applied in the context of other systems. In this regard, any of the concepts disclosed here can be applied generally to vehicles. Examples of such vehicles include automobiles such as buses, cars, trucks, sport utility vehicles, vans, vehicles that do not travel on land such as mechanical water vehicles including watercraft, hovercraft, sailcraft, boats and ships, mechanical under water vehicles including submarines, mechanical air vehicles including aircraft and spacecraft, mechanical rail vehicles such as trains, trams and trolleys, etc. In addition, the term vehicle is not limited by any specific propulsion technology such as gasoline or diesel fuel. Rather, vehicles also include hybrid vehicles, battery electric vehicles, hydrogen vehicles, and vehicles which operate using various other alternative fuels.

It should be observed that the disclosed embodiments reside primarily in combinations of method steps and apparatus components. Those of skill would further appreciate that the various illustrative logical blocks, modules, circuits, and algorithm steps described in connection with the embodiments disclosed herein may be implemented as electronic hardware, computer software, or combinations of both. The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. An electric motor system, comprising:
    an electric motor comprising a stator with windings and a rotor configured to operate at a motor speed;
    a cooling system comprising coolant configured to cool the rotor and the stator, the coolant having a coolant flow rate and a coolant temperature;
    an inverter module coupled to the electric motor and configured to provide current to the windings based on inverter control signals;
    a current regulated torque controller coupled to the inverter module and configured to generate the inverter control signals in response to a derated torque command; and
    a temperature estimation controller coupled to the current regulated torque controller and configured to generate the derated torque command based on an initial torque command and an estimated stator winding temperature, the temperature estimation controller configured to estimate the estimated stator winding temperature based on the motor speed and the coolant flow rate.

2. The electric motor system of claim 1, wherein the temperature estimation controller is configured to compare the motor speed to a threshold motor speed, the temperature estimation controller further configured to estimate the stator winding temperature as a high speed stator winding temperature when the motor speed is equal to or greater than the threshold motor speed and as a low speed stator winding temperature when the motor speed is less than the threshold motor speed.

3. The electric motor system of claim 2, wherein the temperature estimation controller, when the motor speed is equal to or greater than the threshold motor speed, is configured to
    determine a stator winding resistance;
    determine a stator winding power loss based on the stator winding resistance and a root mean square stator current;
    determine a total power loss of the electric motor based on the stator winding power loss and a core power loss;
    generate a temperature change based on the total power loss, the motor speed and a combined thermal impedance; and
    estimate the stator winding temperature based on the temperature change, the coolant temperature, and the coolant flow rate.

4. The electric motor system of claim 3, wherein the stator further includes a stator core, and
    wherein the temperature estimation controller is configured to determine the combined thermal impedance based on a first thermal impedance between the stator winding and the stator core and a second thermal impedance between the stator core and the motor coolant.

5. The electric motor system of claim 3, wherein the temperature estimation controller is configured to determine the core power loss as a function of the motor speed, a stator winding current, and a DC bus voltage.

6. The electric motor system of claim 3, wherein the temperature estimation controller comprises a plurality of lookup tables that correlate the motor speed and the coolant flow rate with a natural damped frequency, a damping factor, and a thermal impedance.

7. The electric motor system of claim 6, wherein the temperature estimation controller is configured to generate the temperature change based on the plurality of lookup tables.

8. A method for estimating stator winding temperatures in a motor having a stator with a plurality of windings and a rotor configured to operate at a motor speed, the motor further configured to be cooled by a coolant at a coolant flow rate, the method comprising the steps of:
    comparing the motor speed to a speed threshold;
    generating estimated total power losses of the electric motor;
    calculating combined thermal impedances between the plurality of windings and the coolant based on the motor speed and the coolant flow rate; and
    estimating, when motor speed is greater than the speed threshold, first estimated stator winding temperatures for each of the plurality of stator windings based on the combined thermal impedances and the total power losses.

9. The method of claim 8, wherein generating step includes combining stator winding power losses and core power losses to generate the total power losses.

10. The method of claim 9, wherein the generating step further includes determining the stator winding power losses based on stator winding resistances and root mean square stator currents.

11. The method of claim 8, wherein the step of determining the stator winding power losses comprises:
    determining alternating current root mean square stator currents; and
    determining the stator winding power losses based on the alternating current root mean square stator currents.

12. The method of claim 8, wherein the calculating step includes generating a phase temperatures changes based on the total power losses, the motor speed and the combined thermal impedances.

13. The method of claim 8, wherein the estimating step further includes estimating the stator winding temperatures based on phase temperature changes and the coolant temperature.

14. The method of claim 8, wherein said combined thermal impedances comprise first thermal impedances between the stator windings and stator cores, and second thermal impedances between stator cores and the coolant.

15. The method of claim 8, wherein the calculating step includes determining the combined thermal impedances with look-up tables.

16. The method of claim 8, wherein the calculating step includes determining the combined thermal impedances with look-up tables that correlate the motor speed and coolant flow rate with a natural damped frequency, a damping factor, and a thermal impedance.

17. The method of with claim 8, further comprising the step of:
   derating a torque command in response to the first estimated stator winding temperatures.

18. A method comprising the steps of:
   determining a stator winding resistance for a stator winding of a motor based on a temperature of the stator winding and a temperature coefficient of resistance of the stator winding;
   determining a stator winding power loss based on the stator winding resistance;
   determining a total power loss based on the stator winding power loss and a core power loss;
   determining a phase temperature change based on the total power loss, a motor speed, a coolant flow rate, and a combined thermal impedance model; and
   estimating a stator winding temperature based on the phase temperature change and a motor coolant temperature.

19. The method of claim 18, wherein the step of determining the phase changes includes generating the phase temperature change based on the total power loss, the motor speed and the combined thermal impedance.

20. The method of claim 18, wherein the estimating step further includes estimating the stator winding temperature for each of the plurality stator windings based on the phase temperature changes and the motor coolant temperature.

* * * * *